UNITED STATES PATENT OFFICE.

ALFRED SCHAARSCHMIDT, OF BASEL, SWITZERLAND, ASSIGNOR TO SOCIETY OF CHEMICAL INDUSTRY IN BASLE, OF BASEL, SWITZERLAND.

ORANGE SULFUR DYE AND PROCESS OF MAKING SAME.

966,478. Specification of Letters Patent. Patented Aug. 9, 1910.

No Drawing. Application filed February 3, 1910. Serial No. 541,695.

*To all whom it may concern:*

Be it known that I, ALFRED SCHAARSCHMIDT, a subject of the King of Saxony, and resident of Basel, Switzerland, have invented new and useful Orange Sulfurized Vat Dyestuffs of the Anthracene Series and a Process of Making Same, of which the following is a full, clear, and exact specification.

According to the United States Letters Patent No. 899,845, dated September 29th, 1908, and No. 902,895, dated November 3d, 1908, orange to yellow vat dyestuffs are obtained by subjecting the crude dyestuffs made by melting 2-methylanthraquinone or omega-monochloro-2-methylanthraquinone with sulfur at a temperature below 300° C. to a treatment with a hypochlorite.

According to the present invention orange vat-dyestuffs are obtained by treating the said crude dyestuffs with concentrated sulfuric acid before the treatment with hypochlorite.

The following examples illustrate the invention, the parts being by weight.

Example 1: 30 parts of the crude dyestuff made by melting 1 part of 2-methylanthraquinone with 3 parts of sulfur at 250–300° C. are introduced into 600 parts of surfuric acid of 66° Baumé specific gravity and the mixture is heated, while stirring, for 3–4 hours in the oil bath at 140–150° C., this being the temperature of the bath. The cooled mass is introduced into water and the brownish black flocks which separate are filtered and washed until neutral. To the paste thus obtained there is added, while stirring, first at ordinary temperature and finally while gently warming, a solution of sodium hypochlorite until the active chlorin reaction is permanent. The original brownish black color of the paste is thus changed to orange brick red. After cooling, the mixture is filtered and the solid matter is washed, pressed and dried. The dyestuff forms a brick red powder and yields, when treated with alkaline hydrosulfite solution, a red-brown vat; this dyes cotton red-brown tints, which by exposure to air, or more quickly by handling in a dilute hypochlorite solution, become clear orange of excellent fastness to washing, light and chlorin.

Example 2: 20 parts of the product made by heating 1 part of omega-monochloro-2-methylanthraquinone with 3 parts of sulfur at 220–230° C. are introduced into 300–400 parts of concentrated sulfuric acid and the mixture is heated at the temperature of the water bath for 6 hours, while stirring. The mass is then introduced into water and the black brown product, separated by filtration, is treated in the manner described in Example 1 with a solution of sodium hypochlorite. The dyestuff thus obtained has properties similar to those of the dyestuff made according to Example 1.

With respect to the treatment with hypochlorite it is to be noted that the hypochlorite need not be previously formed; for the same result may be attained by suspending the dyestuff which has been treated with sulfuric acid, in a solution of common salt and passing an electric current through the solution.

What I claim is:

1. The described process for the manufacture of orange sulfurized vat dyestuffs, which consists in treating the crude dyestuffs obtained by melting 2-methylanthraquinone with sulfur at a temperature below 300° C. with concentrated sulfuric acid and then treating the resulting products with a hypochlorite.

2. The described process for the manufacture of orange sulfurized vat dyestuffs which consists in treating the crude dyestuffs obtained by melting omega-monochloro-2-methylanthraquinone with sulfur at a temperature below 300° C. with concentrated sulfuric acid and then treating the resulting products with a hypochlorite.

3. As new products the vat-dyestuffs, obtainable by treating the crude dyestuffs obtained by melting 2-methylanthraquinone with sulfur at a temperature below 300° C. with concentrated sulfuric acid and then treating the resulting product with a hypochlorite, constituting in dry state brick red powders and yielding, when treated with alkaline hydrosulfite solution, red-brown vats dyeing cotton red-brown tints, which by exposure to air or by a treatment with a dilute hypochlorite solution, become clear orange of excellent fastness to washing, light and chlorin.

4. As new products the vat-dyestuffs, obtainable by treating the crude dyestuffs obtained by melting omega-monochloro-2- methylanthraquinone with sulfur at a temperature below 300° C. with concentrated sulfuric acid and then treating the resulting product with a hypochlorite, constituting in dry state brick red powders and yielding, when treated with alkaline hydrosulfite solution, red-brown vats dyeing cotton red-brown tints, which by exposure to air or by a treatment with a dilute hypochlorite solution, become clear orange of excellent fastness to washing, light and chlorin.

In witness whereof I have hereunto signed my name this 21st day of January 1910, in the presence of two subscribing witnesses.

ALFRED SCHAARSCHMIDT.

Witnesses:
 GEO. GIFFORD,
 AMAND RITTER.